United States Patent
Choi et al.

(10) Patent No.: US 9,986,329 B2
(45) Date of Patent: May 29, 2018

(54) DISPLAY APPARATUS

(71) Applicant: SAMSUNG ELECTRONICS CO., LTD., Suwon-si (KR)

(72) Inventors: Dae Su Choi, Suwon-si (KR); Doo Soon Park, Suwon-si (KR); Dae Woo Cho, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days. days.

(21) Appl. No.: 14/939,563

(22) Filed: Nov. 12, 2015

(65) Prior Publication Data

US 2016/0182986 A1 Jun. 23, 2016

(30) Foreign Application Priority Data

Dec. 22, 2014 (KR) .................. 10-2014-0186054

(51) Int. Cl.
*H04R 1/02* (2006.01)
*H04R 1/34* (2006.01)
(Continued)

(52) U.S. Cl.
CPC ............ *H04R 1/342* (2013.01); *H04R 1/222* (2013.01); *H04R 1/406* (2013.01); *H04R 3/005* (2013.01);
(Continued)

(58) Field of Classification Search
CPC ........ H04R 1/222; H04R 1/406; H04R 3/005; H04R 5/02; H04R 2201/403; H04R 2410/01; H04R 2499/11; H04R 2499/15; H04R 1/342; H04R 1/02

USPC ....... 381/306, 333, 355, 356, 360, 361, 365, 381/368, 388; 361/679.23, 679.26, 361/679.55

See application file for complete search history.

(56) References Cited

U.S. PATENT DOCUMENTS 5,400,408 A * 3/1995 Lundgren ............. G06F 1/1605
                                                          381/306
5,613,011 A   3/1997 Chase et al.
(Continued)

FOREIGN PATENT DOCUMENTS

EP          2611146 A1    7/2013
KR     10-2013-0077090    7/2013
(Continued)

OTHER PUBLICATIONS

International Search Report dated Mar. 14, 2016 in corresponding International Patent Application No. PCT/KR2015/012115.
(Continued)

*Primary Examiner* — Huyen D Le
(74) *Attorney, Agent, or Firm* — Staas & Halsey LLP

(57) ABSTRACT

A display apparatus includes a display module, a microphone, a front cover disposed in front of the display module, and a frame is disposed on an inner side of the front cover, and covers an edge of the display module, wherein the front cover includes a display part corresponding to the display portion of the display module, and a bezel which covers an edge of a front side of the display module, and the microphone is disposed to be inclined in a forward direction of a center of the display portion of the display module, and thus, the sound recognition rate of the display apparatus user of the user speaking is increased.

13 Claims, 15 Drawing Sheets

(51) Int. Cl.
    *H04R 5/02*     (2006.01)
    *H04R 1/22*     (2006.01)
    *H04R 1/40*     (2006.01)
    *H04R 3/00*     (2006.01)
    *H04N 21/422*     (2011.01)

(52) U.S. Cl.
    CPC ......... *H04R 5/02* (2013.01); *H04N 21/42203* (2013.01); *H04R 2201/403* (2013.01); *H04R 2499/11* (2013.01); *H04R 2499/15* (2013.01)

(56) References Cited

U.S. PATENT DOCUMENTS

| | | | | |
|---|---|---|---|---|
| 6,134,335 | A * | 10/2000 | Yang | H04R 5/02 |
| | | | | 361/679.23 |
| 6,778,963 | B2 * | 8/2004 | Yamamoto | B60R 11/0229 |
| | | | | 704/275 |
| 2002/0080566 | A1 | 6/2002 | Kim | |
| 2004/0239619 | A1 | 12/2004 | Takahashi | |
| 2005/0231587 | A1 | 10/2005 | Root et al. | |
| 2012/0127141 | A1 | 5/2012 | Choi et al. | |
| 2013/0169734 | A1 | 7/2013 | Lee et al. | |

FOREIGN PATENT DOCUMENTS

| | | |
|---|---|---|
| KR | 10-2013-0078742 | 7/2013 |
| KR | 10-2014-0131197 | 11/2014 |

OTHER PUBLICATIONS

Extended European Search Report dated Oct. 6, 2017 in European Patent Application No. 15873473.1.

\* cited by examiner

DISPLAY APPARATUS

CROSS-REFERENCE TO RELATED APPLICATIONS

This application claims the benefit of Korean Patent Application No. 10-2014-0186054, filed on Dec. 22, 2014 in the Korean Intellectual Property Office, the disclosure of which is incorporated herein by reference.

BACKGROUND

1. Field

Embodiments relate to a display apparatus including a microphone.

2. Description of the Related Art

In general, display apparatuses display images on screens, and typically television sets or monitors are equivalents.

The display apparatuses include display modules which display images, and covers which form outer exteriors of the display modules. Among the display apparatuses, there also are display apparatuses which include image cameras and/or microphones to provide various multimedia environments.

Recently, the display apparatuses having curved surfaces and various designs for user's tastes have been formed. In addition, as communication technology develops, the multimedia functions of the display apparatuses have become more important and user demand for clear and vivid sound transmission has been increased.

SUMMARY

Therefore, it is an aspect to provide a display apparatus in which a microphone is disposed in the front of the display apparatus without harming a slim bezel design. Specifically, the display apparatus in which the microphone is interposed between a bezel and a display module in forward and backward directions so that the width of the bezel is not increased is disclosed.

In addition, it is another aspect to provide a display apparatus in which a microphone is disposed to be inclined to effectively recognize a sound of a user positioned in front of the display apparatus.

Additional aspects will be set forth in part in the description which follows and, in part, will be obvious from the description, or may be learned by practice thereof.

In accordance with one aspect, a display apparatus includes a display module including a display portion in which an image is displayed, at least one microphone unit including a microphone, a front cover disposed in front of the display module, and a frame which is disposed on an inner side of the front cover, and covers an edge of the display, and the microphone is disposed at the front cover, and is disposed to be inclined in a forward direction of the center of the display portion of the display module.

The front cover may include a display part corresponding to the display portion of the display module, and a bezel which forms an edge of the display part, and the microphone may be interposed between the bezel and the frame in forward and backward directions.

The bezel may include an inclined portion inclined toward the display part of the front cover.

The microphone may be interposed between the inclined portion of the bezel and the display module in forward and backward directions.

The front cover may include a through hole formed to correspond to a position of the microphone so that a sound passes through, and the through hole is formed to be inclined in the forward direction of the center of the display portion of the display module.

The display apparatus may further include at least one microphone case which covers the microphone, and the at least one microphone case may include an opening portion through which a sound is passable.

The at least one microphone case may be formed of an elastic material.

At least one accommodation groove may be provided in a rear side of the front cover to accommodate the at least one microphone case, and the at least one microphone case may be respectively inserted into the at least one accommodation groove.

When the at least one microphone case is installed in the at least one accommodation groove of the front cover, a surface, in which the opening portion of the at least one microphone case is formed, may be formed to be inclined so that the microphone is disposed to be inclined.

The display apparatus may further include a plurality of microphone units, and the plurality of microphone units are disposed at both sides with respect to the center of the display module.

In accordance with one aspect, a display apparatus includes a display module including a display portion in which an image is displayed, at least one microphone unit including a microphone, a front cover disposed in front of the display module, and a frame which is disposed on an inner side of the front cover, and covers an edge of the display module, and the front cover includes a display part corresponding to the display portion of the display module, and a bezel which forms an edge of the display part, and the microphone is interposed between the bezel and the frame in forward and backward directions.

The bezel may include an inclined portion inclined toward the display part of the front cover, and the microphone may be interposed between the inclined portion of the bezel and the frame in forward and backward directions.

The bezel may include a through hole corresponding to a position of the microphone so that a sound passes through, and the through hole may be formed to be inclined in a forward direction of the display portion of the display module.

The display apparatus may further include at least one microphone case which covers the microphone, and the at least one microphone case may include an opening portion through which a sound is passable.

The at least one microphone case may be formed of an elastic material.

At least one accommodation groove may be provided at a rear side of the bezel to accommodate the at least one microphone case, and the at least one microphone case may be inserted into the at least one accommodation groove.

When the at least one microphone case is installed in at least one accommodation groove of the bezel, a surface, in which the opening portion of the at least one microphone case is formed, may be formed to be inclined so that the microphone is disposed to be inclined.

The display apparatus may further include a plurality of microphone units, and the plurality of microphone units may be disposed at both sides with respect to the center of the display module.

In accordance with still another aspect, a display apparatus includes a display module includes a display portion in which an image is displayed, a front cover positioned in front of the display module, and at least one bracket provided to install at least one microphone at the front cover, and the front cover includes a display part corresponding to the display portion of the display module, and a bezel which forms an edge of the display part, and the at least one bracket is installed at the front cover so that the at least one microphone is positioned in front of the bezel, and the at least one bracket includes an inclined portion inclined toward a display part of the front cover.

The display apparatus may further include at least one microphone case which covers the at least one microphone, the at least one microphone case may include an opening portion through which a sound is passable, the at least one bracket may include a through hole corresponds to a position of the at least one microphone so that a sound passes through, the through hole may be formed to be inclined in a forward direction of the center of the display portion of the display module, at least one accommodation groove may be formed at a rear side of the at least one bracket to accommodate the at least one microphone case, and the at least one microphone case may be inserted into the at least one accommodation groove.

In accordance with one aspect a display apparatus includes a display on which an image is displayed; a front cover in front of the display, a frame on an inner side of the front cover and covering an edge of the display and a microphone in the front cover and having a forward sound projection axis inclined in a direction of a center of the display.

BRIEF DESCRIPTION OF THE DRAWINGS

These and/or other aspects become apparent and more readily appreciated from the following description of the embodiments, taken in conjunction with the accompanying drawings of which.

DETAILED DESCRIPTION

Figure 1:
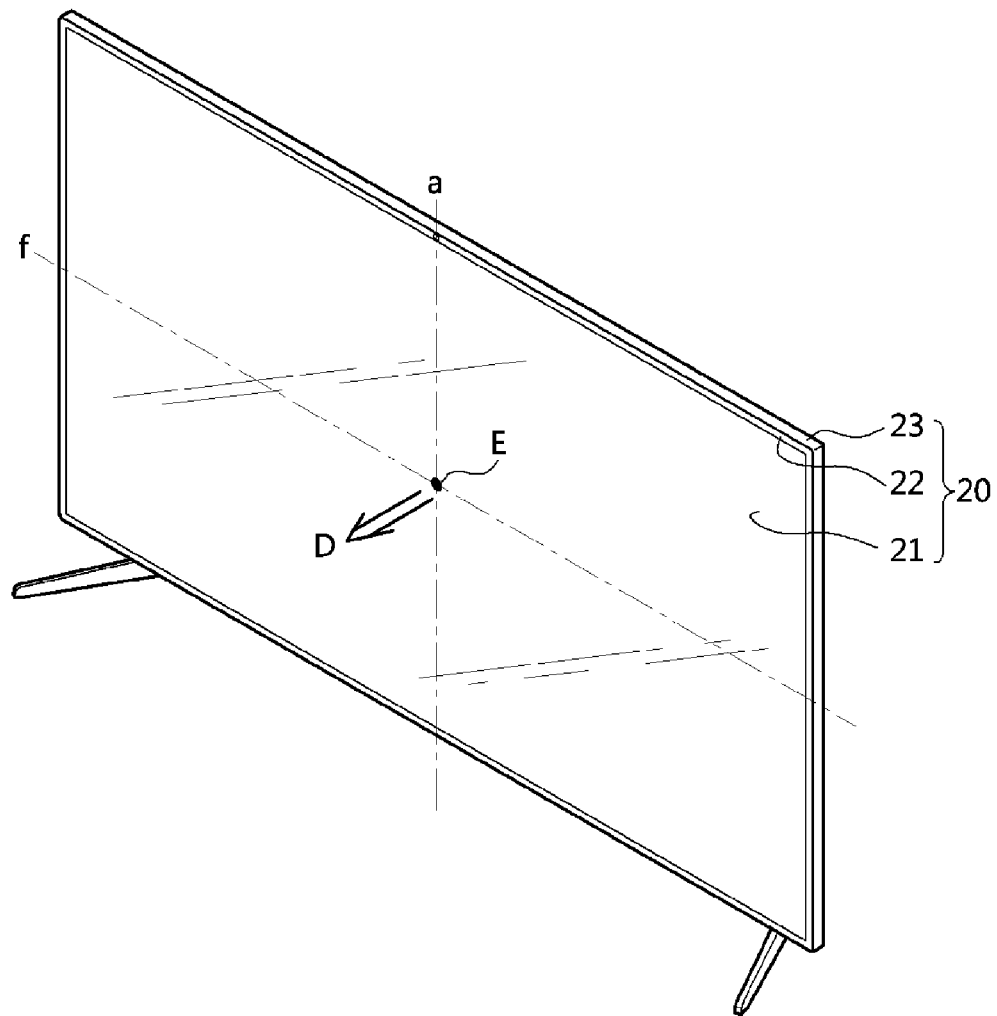
FIGS. 1 and 2 are perspective views illustrating exteriors of a display apparatus according to one embodiment.

Reference will now be made in detail to the embodiments, examples of which are illustrated in the accompanying drawings, wherein like reference numerals refer to like elements throughout.

Recently, display apparatuses have become thinner and larger. Meanwhile, the thickness of a display apparatus has been decreased, and a front surface edge of a display panel, that is, a bezel has also gradually become thinner for a simple design of the display apparatus. In this trend, the positions of components, for instance, cameras, and microphones needed for multimedia functions have been changed from a front to a top, side, bottom, or rear of a display apparatus for a bezel-less design.

When users are in front of a display apparatus, and microphones are installed at a top, side, bottom or rear of the display apparatus, since the microphone receives sounds which have noticeably lowered energy due to diffraction of the sound waves, the intensity and tone of the sounds which are received by the microphones may be changed. Thus, in order for microphones to directly receive loud and clear sounds, it is essential that microphones be installed at a front of a display.

Hereinafter, a display apparatus according to one embodiment will be described below in detail in accordance with the accompanying drawings.

Referring to FIGS. 1 to 10, a display apparatus 1 includes a display module 10 having a display portion 11, microphone units 110 having microphones 112, a front cover 20, a frame 30, a driving unit 40, and a rear cover 50. The front cover 20 is positioned in front of the display module 10, and forms an exterior of the display apparatus 1. The frame 30 is disposed on an inner side of the front cover 20, and covers an edge of the display module 10 to fix the display module 10. The driving unit 40 is interposed between the display module 10 and the rear cover 50 to drive the display module 10 and the microphone 112.

Figure 4:
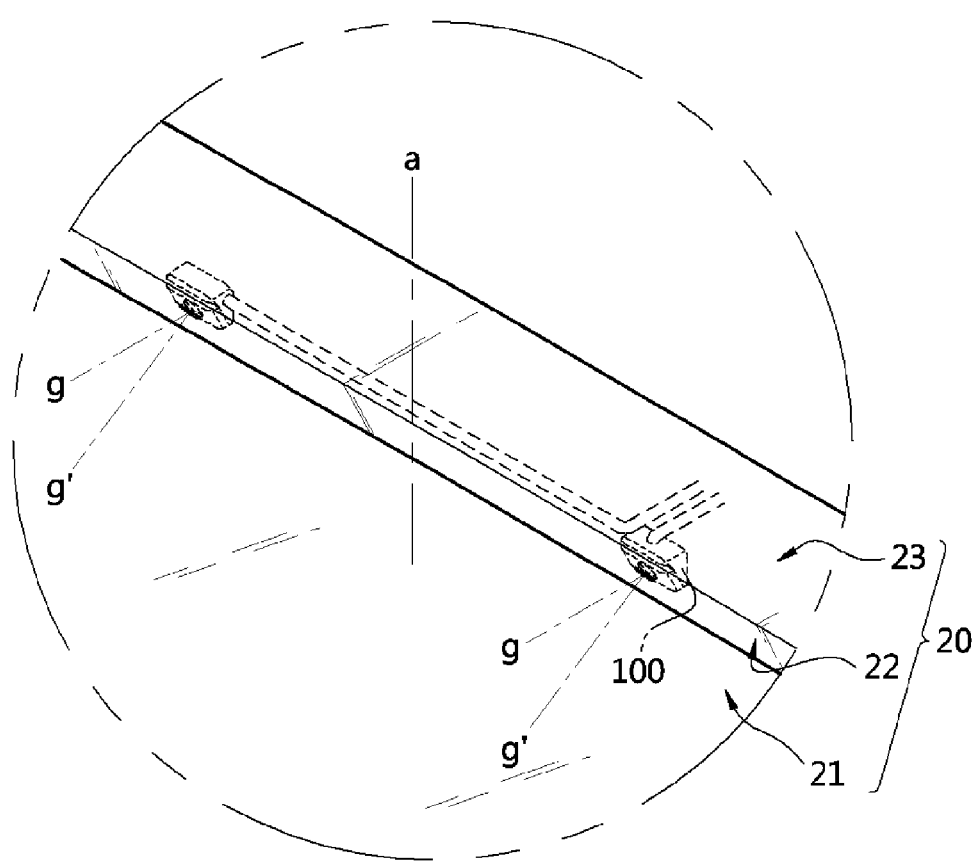
FIG. 4 is an enlarged view of a portion A shown in FIG. 2.

The display portion 11 of the display module 10 refers to an active area of a display panel, that is, the area in which images are actually displayed in the display panel. Referring to FIG. 4, the front cover 20 includes a display part 21 corresponding to the display portion 11 of the display module 10, a bezel 22 which forms an edge of the display part 21, and a cover side surface 23 which extends from the bezel 22 toward the rear cover 50.

The display apparatus according to one embodiment 1 includes at least one microphone module 100. The microphone module 100 includes a microphone unit 110 and a microphone case 120. The microphone unit 110 includes the microphone 112, a cable 111 and a circuit board 113. The display apparatus 1 may also include at least one of the microphone units 110, and further include at least one of the microphone cases 120.

Referring to FIGS. 4 to 10, the microphone 112 is disposed to be inclined in a forward direction D of the display portion 11 of the display module 10. Particularly, the microphone 112 is disposed to be inclined in a forward direction D of a center portion E of the display portion 11 of the display module 10. That is a forward sound projection axis is inclined toward a center of the display portion 11.

As the display apparatus 1 has become large, in a normal state, a user of the display apparatus 1 is positioned in the forward direction D of the center portion E of the display portion 11. As illustrated in the view, when the microphone 112 is disposed in the bezel 22 of an upper side of the front cover 20, the microphone 112 is disposed to be inclined downward so that the microphone 112 faces the forward direction D of the center portion E of the display portion 11. When the microphone 112 is disposed as described above to correspond to a sound transmission direction of a user, the microphone 112 may maximally receive the user's sound without energy loss. In addition, there is an advantage in that an outside noise other than the user's sound which is received by the microphone may be reduced.

Figure 9:
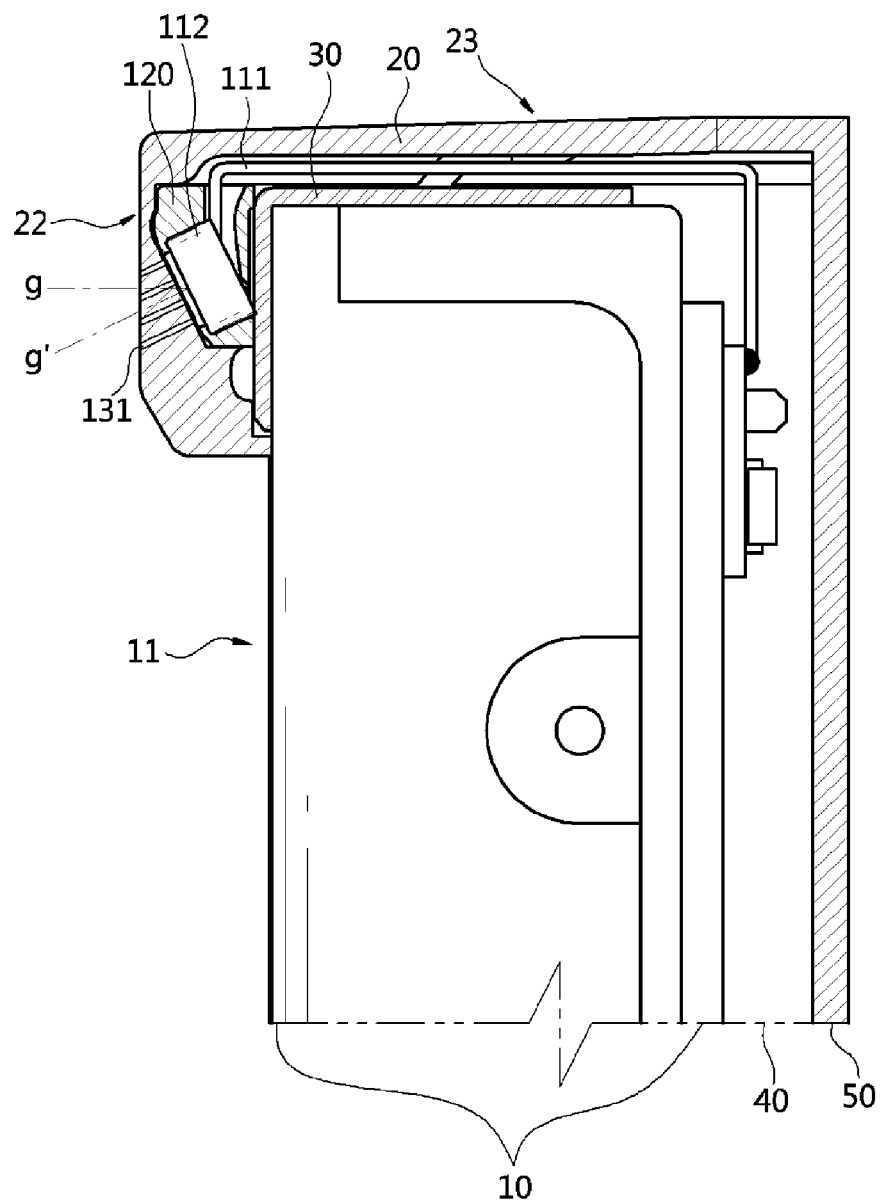
FIG. 9 is a cross-sectional view taken along line a of FIG. 1 or 2.
Figure 10:
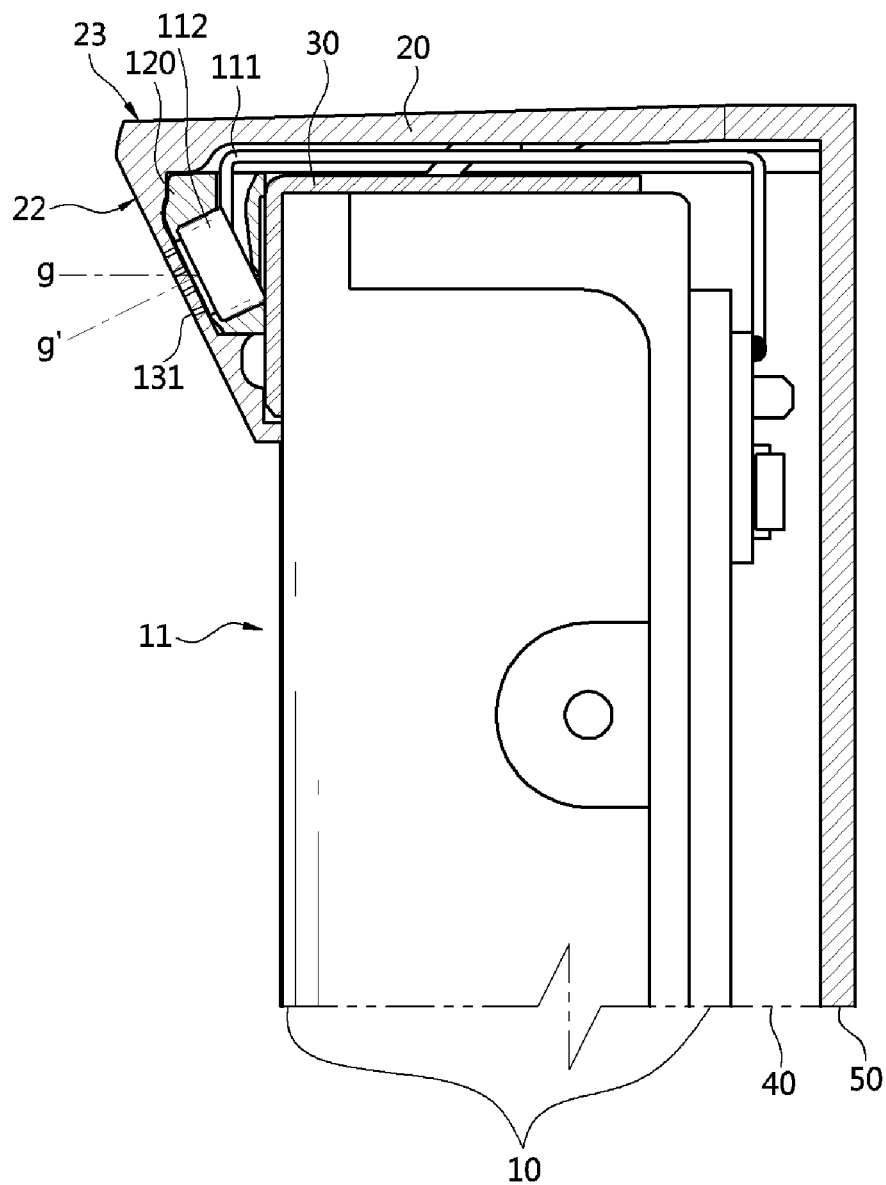
FIG. 10 is a cross-sectional view taken along extended line b' or c' of FIG. 5.
Figure 11:
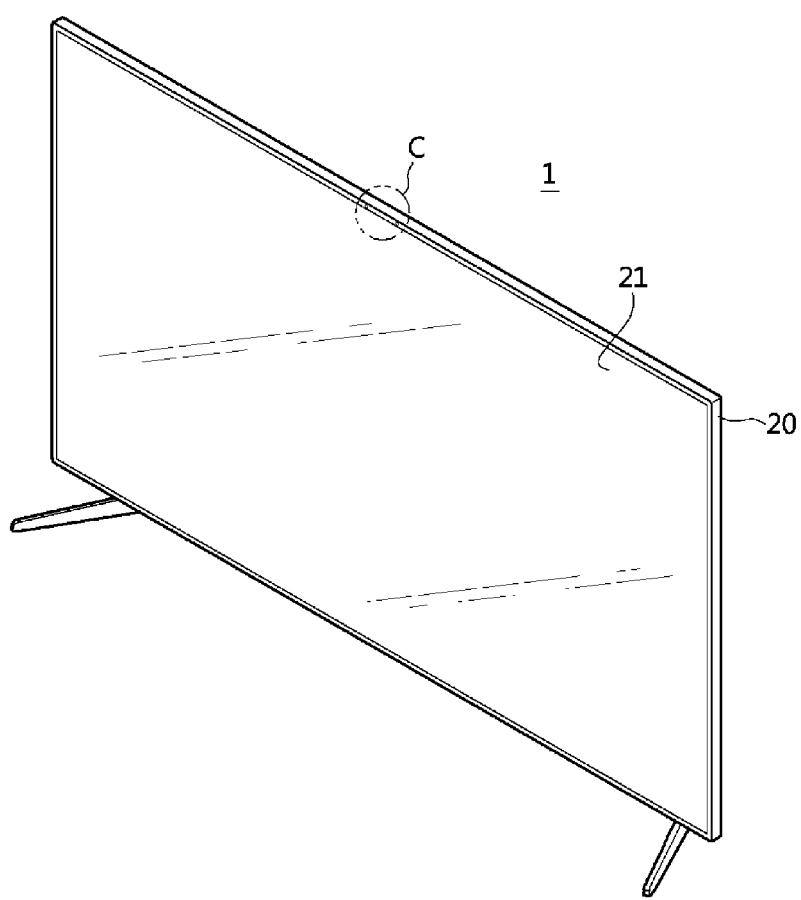
FIG. 11 is a perspective view illustrating an exterior of a display apparatus according to one embodiment.

Referring to FIGS. 4, 9 and 10, an inclined line g' with respect to the horizontal line g refers to a direction in which the microphone 112 receives a sound.

The microphone 112 installed in the display apparatus 1 may not be disposed facing the forward direction D of the center portion E of the display portion 11 according to necessity. When the display apparatus 1 is used in a user environment in which a plurality of users use the display apparatus 1, the microphone 112 needs to be disposed facing the forward direction D or an area outside the forward direction of the display portion 11 of the display apparatus 1. In this case, a sound generated from the front side of the display apparatus 1 may be received uniformly.

Figure 6:
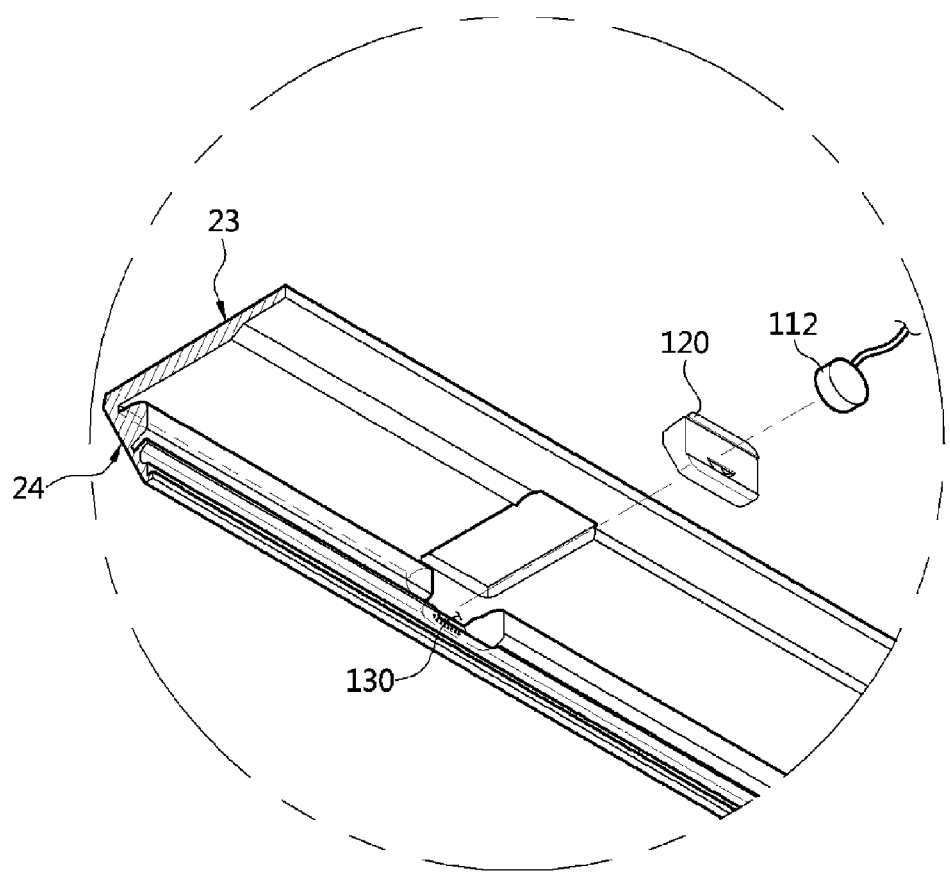
FIG. 6 is an enlarged view of a portion B shown in FIG. 3.

Generally, in order to effectively receive a sound generated from the front side of the display apparatus 1, the microphone 112 is disposed in the bezel 22 of the front cover 20. However, in order to receive a sound generated from a side or rear direction of the display apparatus according to necessity, the microphone 112 may also be disposed in the cover side surface 23 of the front cover 20 or the rear cover 50. Referring to FIGS. 6, 9 and 10, through holes 131 may be provided at a position corresponding to that of the microphone 112 in the bezel 22 so that a sound may pass there through. The through holes 131 may be formed to be inclined in the forward direction D of the display portion 11 of the display module 10. The through holes 131 are formed to be inclined in the forward direction D of the display portion 11 of the display module 10 so that the energy loss of a sound source is maximally reduced while a sound of a user positioned at the forward direction D of the display portion 11 of the display module 10 passes through the bezel 22 and enters the microphone 112.

Figure 8:
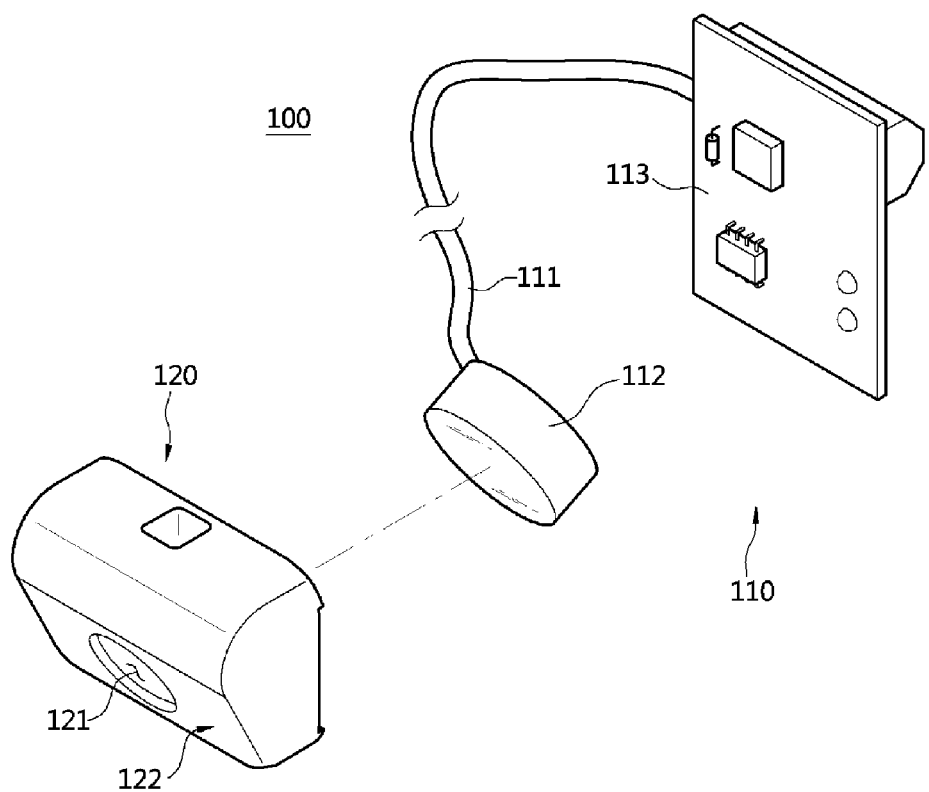
FIG. 8 is a perspective view illustrating a microphone module according to one embodiment.
Figure 13:
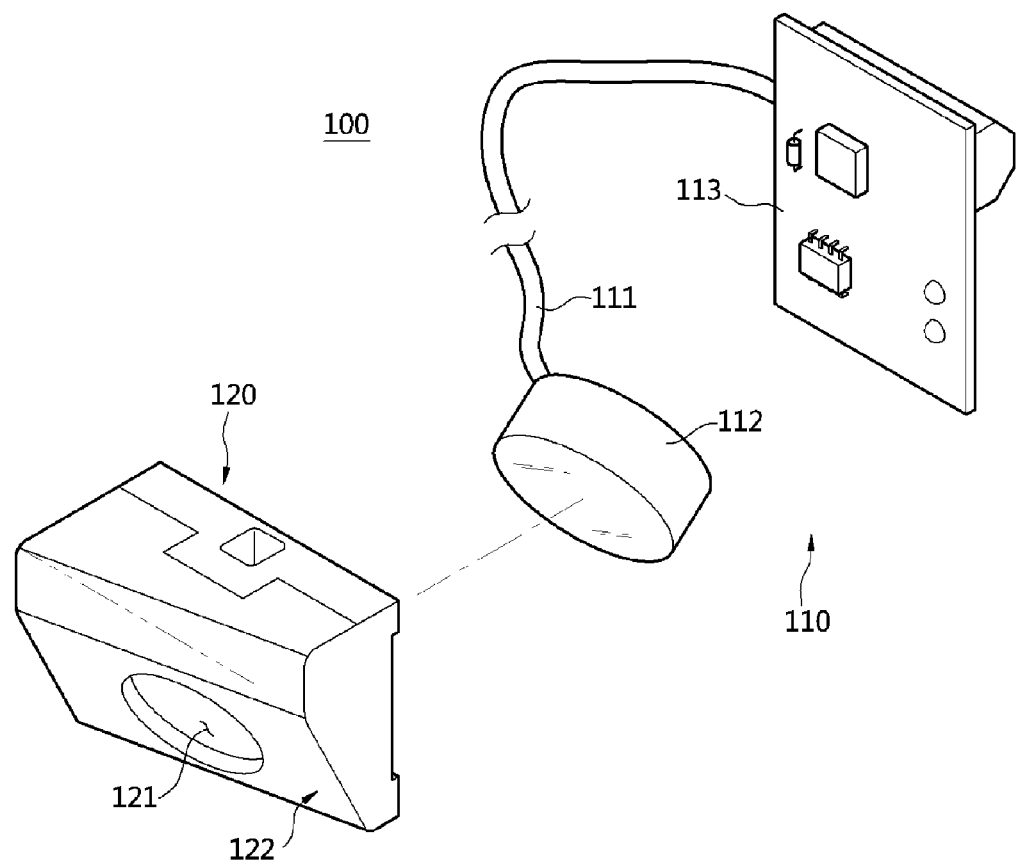
FIG. 13 is a perspective view illustrating a microphone module according to one embodiment.

FIGS. 8 and 13 are exploded perspective views of a microphone module 100 according to different embodiments. FIG. 8 illustrates a case in which a microphone 112 is inclined vertically, and FIG. 13 is a case in which a microphone 112 is inclined vertically and laterally. A direction in which the microphone unit 110 inclines may be a vertical or lateral direction, or vertical and lateral directions according to necessity.

According to one embodiment, when a plurality of microphones 120 are disposed to be inclined in a forward direction of a center portion E of a display portion 11, it is very effective for receiving a concentrated sound of a user positioned at a center of a forward direction D of the display portion 11.

Figure 5:
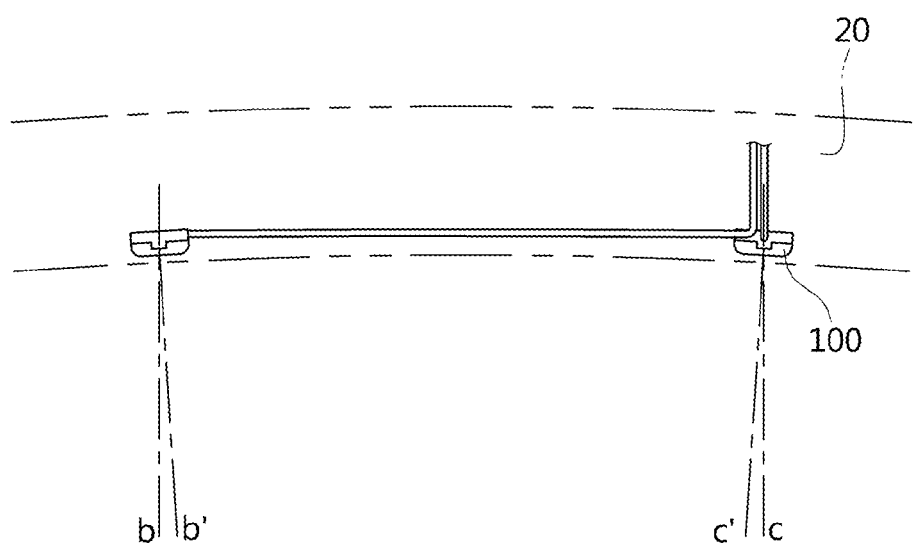
FIG. 5 is a view of the portion A shown in FIG. 2 in a top view.
Figure 12:
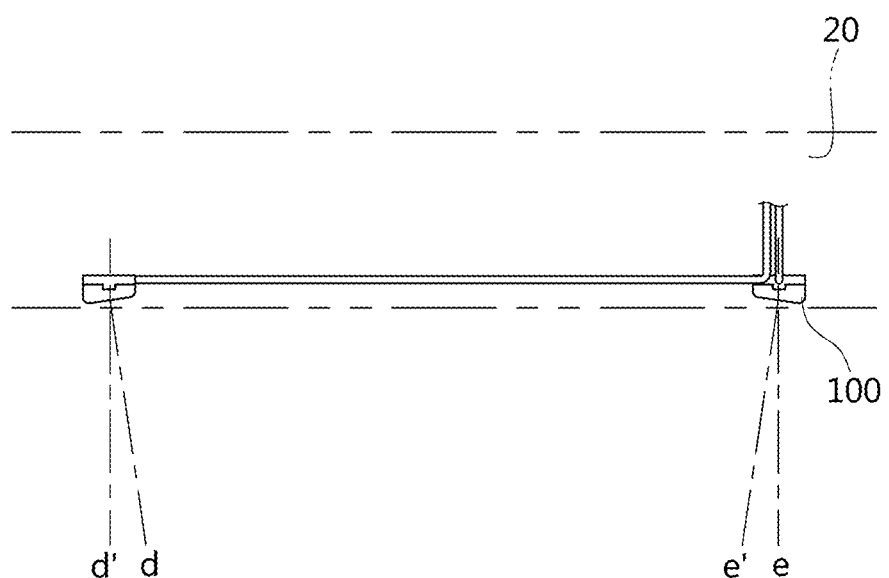
FIG. 12 is a view of the portion C in FIG. 11 in a top view.

Referring to FIGS. 5 and 12, inclined lines b', c', d', and e' with respect to vertical lines b, c, d, and e refer to directions from which the microphones 120 laterally disposed at left and right sides receive sounds.

According to one embodiment, a display apparatus may include the plurality of microphones 120, and directions from which the plurality of microphones 120 receive sounds may be disposed to be vertically or laterally distributed. In this case, it is effective for uniformly receiving sounds from sound sources disposed in a wide area.

Referring to FIGS. 8 and 13, the microphone unit 110 includes the microphone 112, and a cable 111 which transmits a sound received by the microphone 112 to a circuit board 113. The circuit board 113 may be disposed at a driving unit 40 of a display apparatus 1.

A microphone module 100 may be disposed in the display apparatus 1 using a microphone case 120 so that the microphone 112 is easily disposed in the display apparatus 1 in an inclined manner. The microphone case 120 includes an opening portion 121 so that the microphone 112 receives a sound. A surface 122 in which the opening portion 121 of the microphone case 120 is provided is formed to be inclined according to a direction from which the microphone 112 receives a sound.

Figure 7:
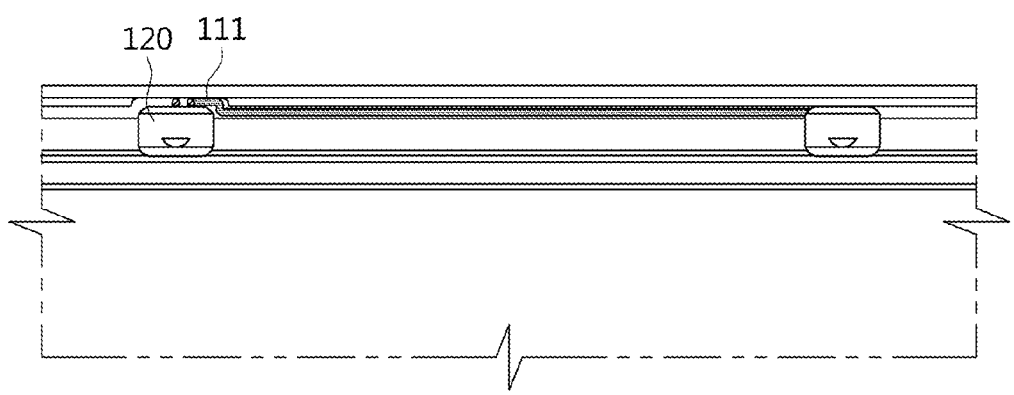
FIG. 7 is a view of the portion B shown in FIG. 3 in a rear view.

Referring to FIGS. 6 to 8, the microphone case 120 is inserted into and installed in an accommodation groove 130 provided at a rear side of a bezel 22 of a front cover 20, and when the microphone module 100 is installed in the accommodation groove 130, the surface 122, in which the opening portion 121 of the microphone case is formed, is formed to be inclined so that the microphone 112 is disposed to be inclined in a required direction from which the microphone 112 receives a sound.

The microphone case 120 may be formed of an elastic material, for instance, silicon or rubber. Since the microphone case 120 may be formed of an elastic material, the microphone 112 may be inserted into the microphone case 120 without an additional fixing mechanism.

Figure 2:
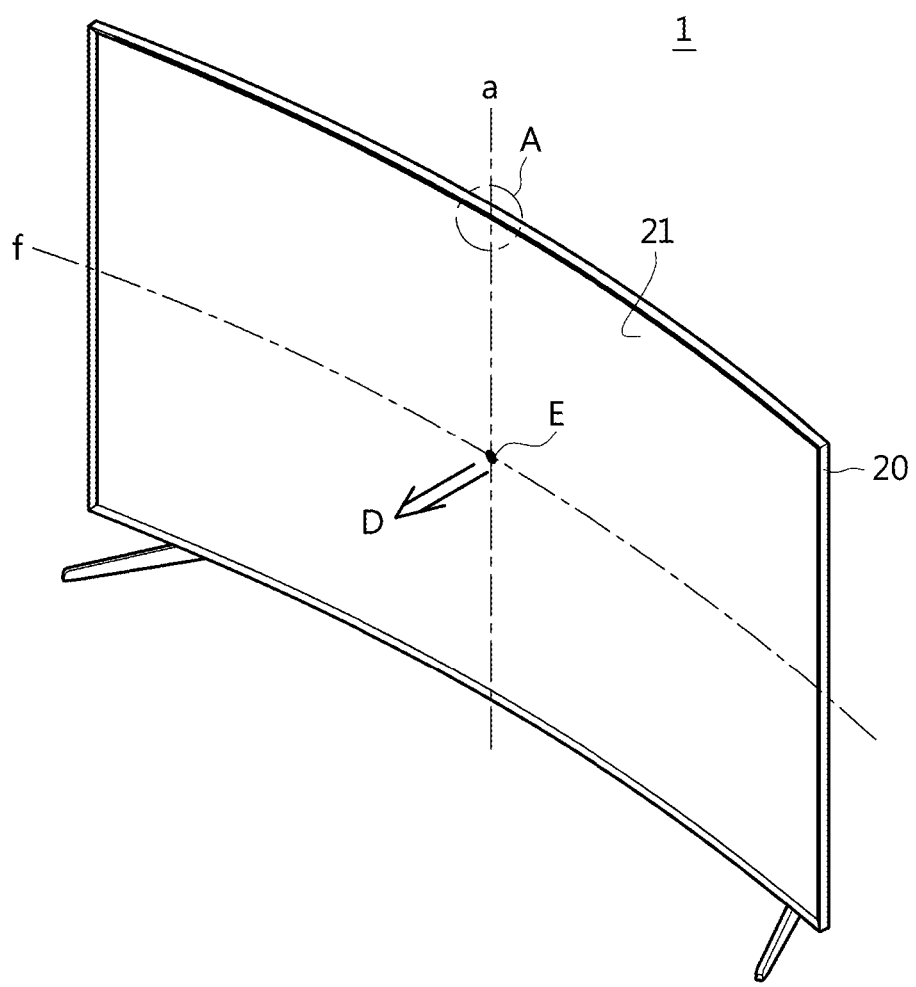
Figure 3:
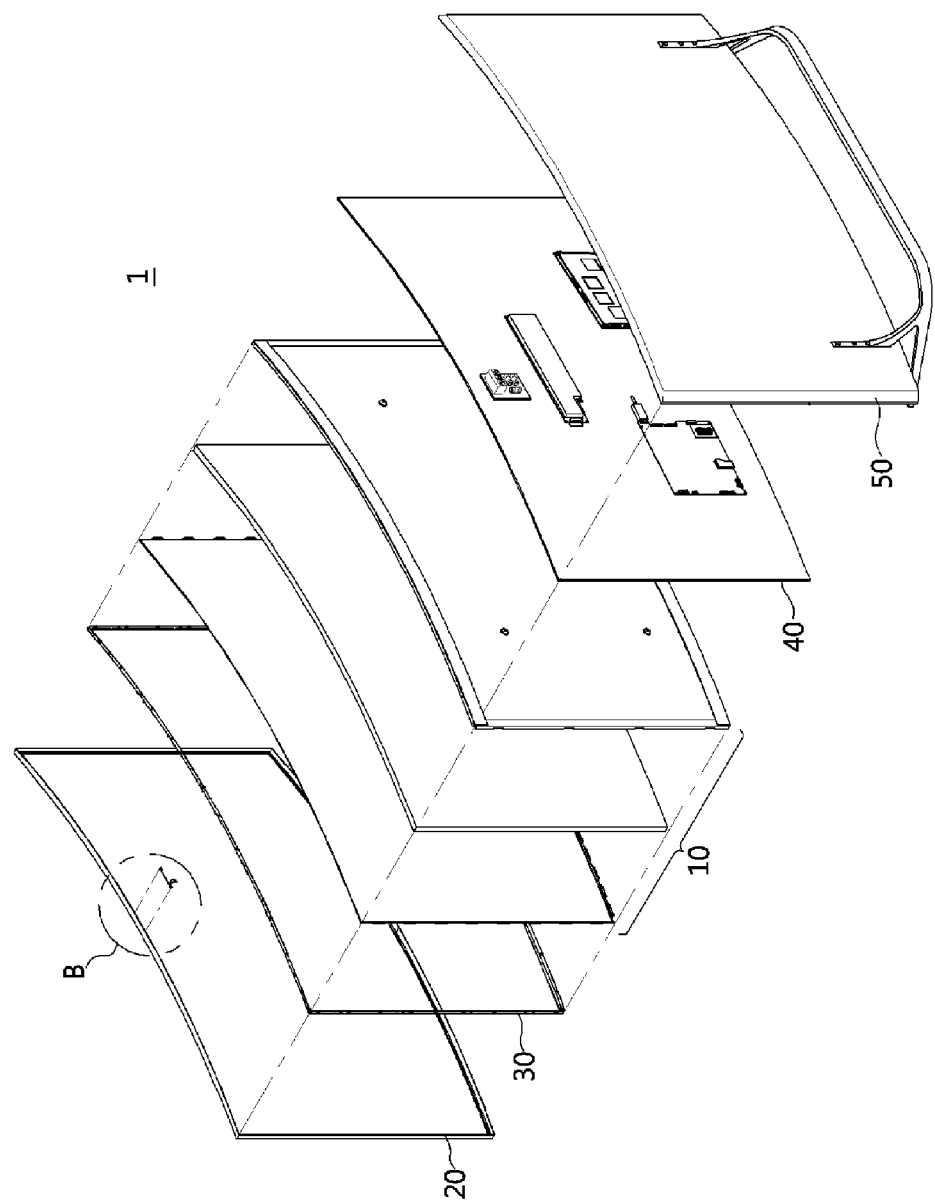
FIG. 3 is an exploded perspective view illustrating main components of the display apparatus shown in FIG. 2.

In addition, the microphone case 120 formed of a flexible material may be inserted into and installed in the accommodation groove 130 without an additional fixing mechanism. When the microphone case 120 is formed of an elastic material, the microphone case 120 may be in close contact with the wall of the accommodation groove 130, and this may help to prevent a sound from escaping between the microphone and the accommodation groove. Referring to FIGS. 1 to 10, in the display apparatus according to one embodiment, the microphone 112 may be interposed between the bezel 22 and a frame 30 in forward and backward directions. A space in which the microphone 112 is disposed may be secured by providing the accommodation groove 130 to install the microphone 112 on a rear side of the bezel 22. The microphone 112 may be interposed between the bezel 22 and the frame 30 in forward and backward directions, and thus, a length of the bezel is prevented from vertically increasing according to the installation of the microphone unit 110. Referring to FIG. 3, in order to secure the space in which the microphone 112 is disposed, the bezel 22 of the front cover 20 may include an inclined portion 24 inclined toward the display part 21.

The bezel 22 may include the inclined portion 24, and thus, a length of which a display module 10 protrudes from the front cover 20 may be minimized, and since the vertical length of the bezel 22 may be minimized, an aesthetically satisfactory design may be realized.

Even when the bezel 22 includes the inclined portion 24, the microphone 112 is interposed between the bezel 22 and the frame 30. This is an important point to be considered to realize a slim bezel.

Referring to FIGS. 2 to 5, although the display apparatus 1 illustrates an embodiment in which two microphone units 110 are installed in a curved display apparatus 1, one or two or more microphone units may be installed in a flat display apparatus.

Referring to FIGS. 1, 8 and 9, in the display apparatus 1 according to one embodiment, the bezel 22 of the display apparatus 1 may be formed not to be inclined, and may be formed to be parallel to the display module 10. The display apparatus 1 may include at least one microphone unit 110. The display apparatus 1 illustrated in FIG. 1 exemplifies the embodiment in which the microphone 112 is installed in the flat display apparatus 1, and the display apparatus 1 illustrated in FIG. 9 exemplifies the embodiment in which the two microphones 112 are installed in the flat display apparatus, however, one or two or more microphone units may be also installed in the curved display apparatus.

As illustrated in FIG. 1, when one microphone unit 110 is included in the display apparatus 1, disposing the microphone unit 110 on a centerline a vertically extending from the display module 10 is preferable to uniformly receive left and right sounds.

When the plurality of microphone units 110 are included in the display apparatus 1, they are preferably disposed at both sides with respect to the center of the display module. Specifically, it is preferable that the plurality of microphone units 110 are disposed at both sides of the centerline a vertically extending or at both sides of a centerline f laterally extending as illustrated in FIGS. 1 and 2.

Two or more microphone units 110 are provided at left and right sides to easily recognize lateral directions at which sound sources are positioned. In addition, when the two or more microphone units 110 are vertically disposed, it becomes easy to recognize vertical directions at which sound sources are positioned.

When the recognition rate of a microphone is increased, a sound generated from an internal speaker is also well received by a microphone. In this case, conventionally, a positive feedback loop in which the sound is received by the microphone and amplified and exits the speaker again is formed, and thus, a "howling phenomenon" which is oscillation state may occur.

However, recently, a technology of noise cancellation which cancels a sound source generated from an internal speaker and entering the microphone using a mirror image of the sound generated from the internal speaker is used to suppress a signal interference with that of the speaker.

According to a concept, when the recognition rate of the microphone is increased, since a mirror image of a reference signal transmitted from an internal speaker and a sound source received by the microphone more accurately cancel each other, the rate of recognition of the microphone is increased to more effectively suppress the interference of the signal with that of the internal speaker.

A display apparatus 1 according to still another embodiment discloses a structure in which a microphone 112 and a microphone case 120 are not embedded in the display apparatus 1, and are detachably installed.

Figure 14:
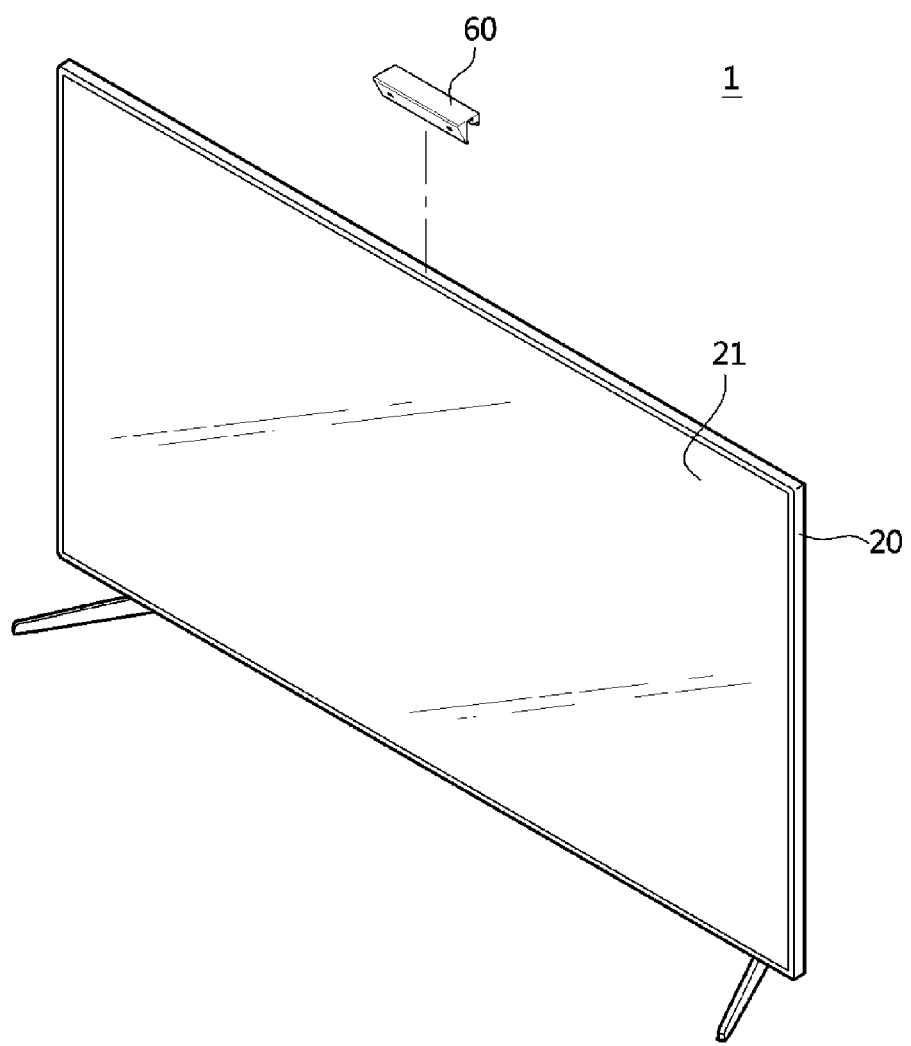
FIG. 14 is a perspective view illustrating a structure in which a microphone is installed in a display apparatus using a bracket according to one embodiment.
Figure 15:
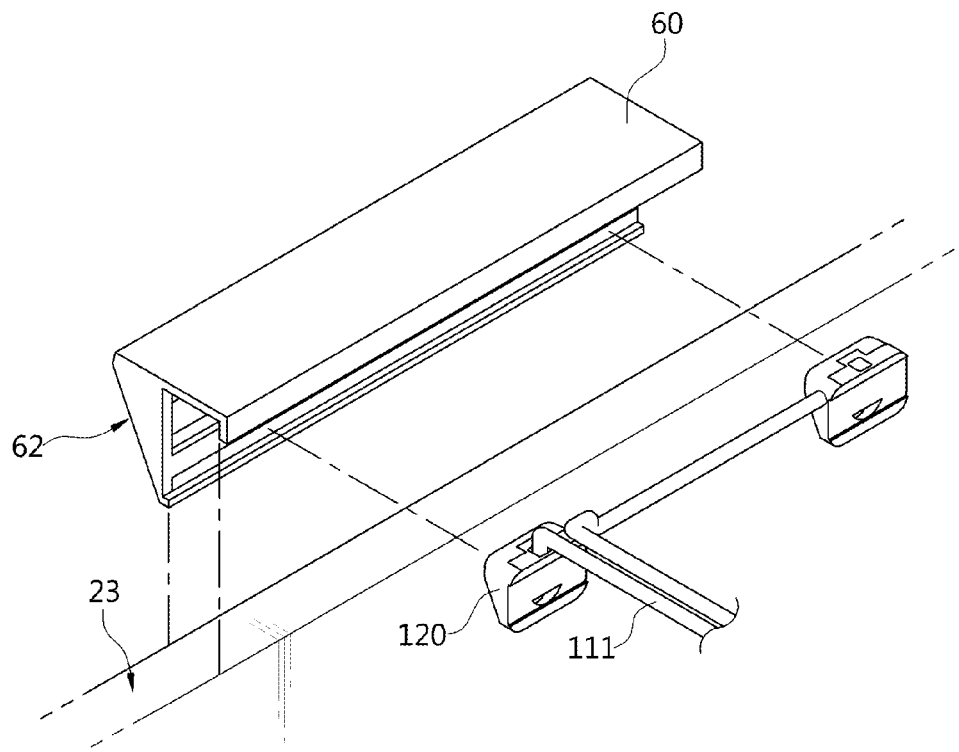
FIG. 15 is an exploded perspective view of the bracket and the microphone shown in FIG. 14.

FIG. 14 is a perspective view illustrating a structure in which a microphone is installed in a display apparatus using a bracket according to one embodiment, and FIG. 15 is an exploded perspective view of the bracket and the microphone in FIG. 14.

A display apparatus 1 includes a display module 10 including a display portion 11, a front cover 20, a frame 30, a driving unit 40, a rear cover 50, and at least one bracket 60.

The front cover 20 is positioned in front of the display module 10, and forms an exterior of the display apparatus 1. The frame 30 is disposed on an inner side of the front cover 20, and covers an edge of the display module 10 to fix the display module 10. The driving unit 40 is interposed between the display module 10 and the rear cover 50 of to drive the display module 10 and microphones 112.

The display portion 11 of the display module 10 refers to an active area of a display panel, that is, the area in which images are actually displayed in the display panel. The front cover 20 includes a display part 21 corresponding to the display portion 11 of the display module 10, a bezel 22 which forms an edge of the display part 21, and a cover side surface 23 which extends from the bezel 22 toward the rear cover 50.

Referring to FIGS. 14 and 15, the bracket 60 is provided to install at least one microphone 112 on the front cover 20. The microphone 112 may be disposed in the bracket 60, and installed at the front cover 20 to be positioned in front of the bezel 22 by the bracket 60. The bracket 60 may include an inclined portion 62 inclined toward the display part 21 of the front cover 20.

Through holes 131 may be provided in the bracket 60 corresponding to position of the microphone 112 so that a sound passes through. The through hole 131 may be formed to be inclined in a forward direction of the display portion 11 of the display module 10. The through holes 131 are formed to be inclined in a forward direction of the display portion 11 of the display module 10 so that the energy loss of a sound source is maximally reduced while a sound of a user positioned at the forward direction D of the display portion 11 of the display module 10 passes through the bracket 60 and enters the microphone 112.

A microphone case 120 which covers the microphone 112 may be used to easily install the microphone 112 at a rear side of the bracket 60. An opening portion 121 is provided in the microphone case 120 so that the microphone 112 may receive a sound.

An accommodation groove 130 to accommodate the microphone case 120 is formed at the rear side of the bracket 60. The accommodation groove 130 may be also provided to accommodate the microphone 112 without the microphone case 120.

It is preferable that the microphone case 120 be formed of an elastic material. For example, the microphone case 120 may be formed of rubber or silicon.

The microphone case 120 is inserted into the accommodation groove 130, and the microphone case 120 formed of an elastic material may be fixed in the accommodation groove 130 without an additional fixing mechanism. In addition, when the microphone case 120 is formed of an elastic material, the microphone case 120 may be in close contact with a wall of the accommodation groove 130, and this may help to prevent a sound from escaping.

The microphone 112 may be disposed to be inclined to correspond to the inclined portion 62 of the bracket 60. In addition, when the microphone case 120 is disposed in the accommodation groove 130 of the bracket 60, a surface 122, in which the opening portion 121 of the microphone case 120 is formed, may be formed to be inclined so that the microphone 112 is disposed to correspond to the inclined portion 62 of the bracket 60.

As is apparent from the above description, a bezel of a display apparatus according to one concept is formed to be inclined and protruded in an outward/forward direction with respect to a display part, and thus, the display part is stably positioned like a picture frame compared to an outside of the display apparatus. Thus, when a user watches the display apparatus, a user's degree of immersion and stability is increased.

In addition, since a microphone is disposed at an area of a bezel of a display apparatus in an inclined manner without harming a design of the display apparatus, an installation area of the microphone is minimized, and during a video call or a voice control of the display apparatus, the voice of a user can be effectively recognized.

That is, even when the display apparatus is installed on a wall using a wall-hanger or on a table using a stand, a center portion of a display part is the optimum position to watch the display apparatus, particularly, a television set to which an embodiment is applied, and when a user speaks during a video call or a voice control, a voice recognition rate can be improved.

According to one concept, since a microphone disposed in a display apparatus is installed in the front of the display apparatus, a recognition rate for an internal speaker's sound toward a front of the display apparatus is increased, and thus, the signal interference with the internal speaker can be reduced using a noise cancellation technology.

According to one concept, since a microphone is accommodated in a microphone case formed of an elastic material, the microphone is disposed by being pressed and being fixed in an inside of a bezel, and fixed according to a frictional force, and thus, fixing components are reduced and an assembly process is easy.

In addition, according to one concept, a microphone case formed of an elastic material can effectively prevent a sound from escaping between a display apparatus and a microphone.

Although the concept is described with specific embodiments, the scope the embodiments are not limited to the above-described specific embodiments. Various other embodiments that may be changed or modified by those skilled in the art without departing from the scope and spirit defined by the appended claims will also fall within the scope of the embodiments.

What is claimed is:

1. A display apparatus, comprising:
   a display module including a display portion on which an image is displayed;
   at least one microphone unit including a microphone;
   a front cover disposed in front of the display module; and
   a frame which is disposed on an inner side of the front cover, and covers an edge of the display module,
   wherein the microphone is disposed at the front cover, and is disposed to be inclined in a forward direction toward a center of the display portion of the display module,
   wherein at least one microphone case includes an opening portion through which sound is passable,
   wherein:
      at least one accommodation groove is provided in a rear side of the front cover to accommodate the at least one microphone case, and
      the at least one microphone case is inserted into the at least one accommodation groove,
   wherein, when the at least one microphone case is installed in the at least one accommodation groove of the front cover, a surface, in which the opening portion of the at least one microphone case is formed, is formed to be inclined with the microphone disposed to be inclined.

2. The display apparatus of claim 1, wherein:
   the front cover includes a display part corresponding to the display portion of the display module, and a bezel which forms an edge of the display part; and
   the microphone is interposed between the bezel and the frame in forward and backward directions.

3. The display apparatus of claim 2, wherein the bezel includes an inclined portion inclined toward the display part of the front cover.

4. The display apparatus of claim 3, wherein the microphone is interposed between the inclined portion of the bezel and the display module in the forward and backward directions.

5. The display apparatus of claim 1, wherein the front cover includes a through hole formed to correspond to a position of the microphone where sound passes through, and the through hole is formed to be inclined toward the front of the center of the display portion of the display module.

6. The display apparatus of claim 1, wherein the at least one microphone case is formed of an elastic material.

7. The display apparatus of claim 1, further comprising a plurality of microphone units, wherein the plurality of microphone units are disposed at both sides based on the center of the display module.

8. A display apparatus, comprising:
   a display module including a display portion on which an image is displayed;
   at least one microphone unit including a microphone;
   a front cover disposed in front of the display module; and
   a frame which is disposed on an inner side of the front cover, and covers an edge of the display module,
   at least one microphone case which covers the microphone, wherein the at least one microphone case includes an opening portion through which a sound is passable,
   wherein the front cover includes a display part corresponding to the display portion of the display module, and a bezel which forms an edge of the display part, and the microphone is interposed between the bezel and the frame in forward and backward directions,
   wherein the microphone is disposed at the front cover, and is disposed to be inclined in a forward direction of a center of the display portion of the display module,
   wherein the at least one microphone case is formed of an elastic material, and
   wherein, when the at least one microphone case is installed in at least one accommodation groove of the bezel, a surface, in which the opening portion of the at least one microphone case is formed, is formed to be inclined with the microphone disposed to be inclined.

9. The display apparatus of claim 8, wherein:
   the bezel includes an inclined portion inclined toward the display part of the front cover; and
   the microphone is interposed between the inclined portion of the bezel and the frame in the forward and backward directions.

10. The display apparatus of claim 8, wherein the bezel includes a through hole corresponding to a position of the microphone where a sound passes through, and the through hole is formed to be inclined in a forward direction of the display portion of the display module.

11. The display apparatus of claim 8, wherein:
    the at least one accommodation groove is provided in a rear side of the bezel to accommodate the at least one microphone case; and
    the at least one microphone case is inserted into the at least one accommodation groove.

12. The display apparatus of claim 8, further comprising a plurality of microphone units, wherein the plurality of microphone units are disposed at both sides based on a center of the display module.

13. A display apparatus, comprising:
    a display module includes a display portion on which an image is displayed;
    a front cover positioned in front of the display module;
    at least one bracket provided to install at least one microphone on the front cover; and
    at least one microphone case which covers the at least one microphone, wherein:
    the front cover includes a display part corresponding to the display portion of the display module, and a bezel which forms an edge of the display part,
    the at least one bracket is installed on the front cover where the at least one microphone is positioned in front of the bezel, the at least one bracket includes an inclined portion inclined toward a display part of the front cover inclining the microphone toward a center of the display portion, the at least one microphone case includes an opening portion through which a sound is passable, the at least one bracket includes a through hole which corresponds to a position of the at least one microphone where the sound passes through, the through hole is formed to be inclined in a forward direction of the center of the display portion of the display module, at least one accommodation groove is formed at a rear side of the at least one bracket to accommodate the at least one microphone case, and the at least one microphone case is inserted into the at least one accommodation groove.

\* \* \* \* \*